7995X

Sheet 1, 3 Sheets.

D. Treadwell.

Spinning Mach.

Patented Feb. 3, 1834.

7995X

Sheet 2, 3 Sheets

D. Treadwell.

Spinning Mach.

Patented Feb. 3, 1834.

D. Treadwell.

Spinning Mach.

Patented Feb. 3, 1834.

Daniel Treadwell Feb. 3. 1834 2442 7995 X

The schedule referred to in these Letters Patent and making part of the same, containing a description in the words of the said Daniel Treadwell himself, of his improvement in the machine for making rovings of hemp, flax or other fibrous substances, called a "Belted Roving Machine"

Be it known that the following contains a true specification of an improvement invented by me, Daniel Treadwell of the City of Boston in the Commonwealth of Massachusetts, Engineer, in the machine for drawing, roping, roving slivers of fillaments of Hemp, flax, or other fibrous Substances. – The machine thus improved I call a Belted Roving Machine. That the improvement may be perfectly understood, I have hereto attached drawings of a machine, which drawings are referred to from and explained by this specification, and are hereby declared to make a part of the same. These drawings are taken from a machine for drawing rovings of hemp for spinning rope yarns, consequently they show the proportions of such a machine, and are on the scale of three inches to a foot.

Figure 1:
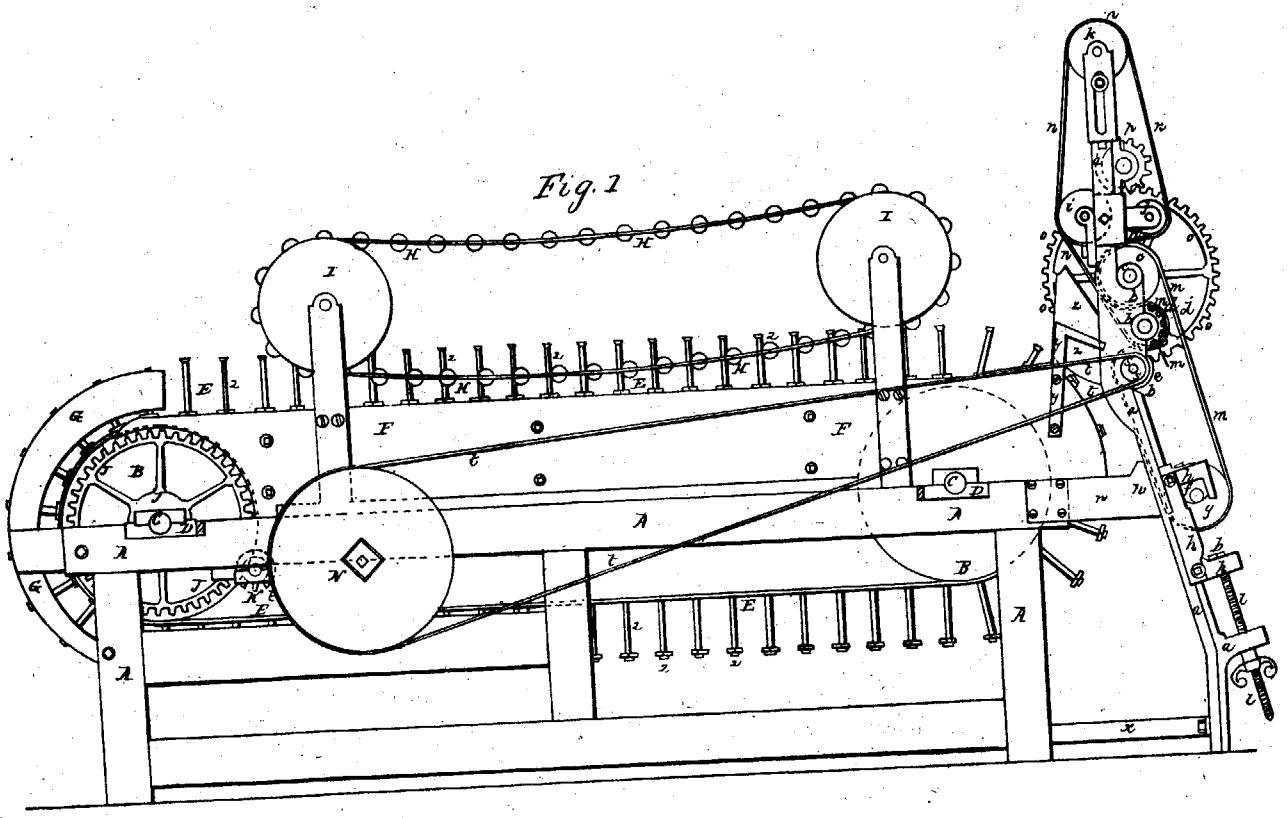

Fig. 1. shews an elevation of the side of the machine.

Figure 2:
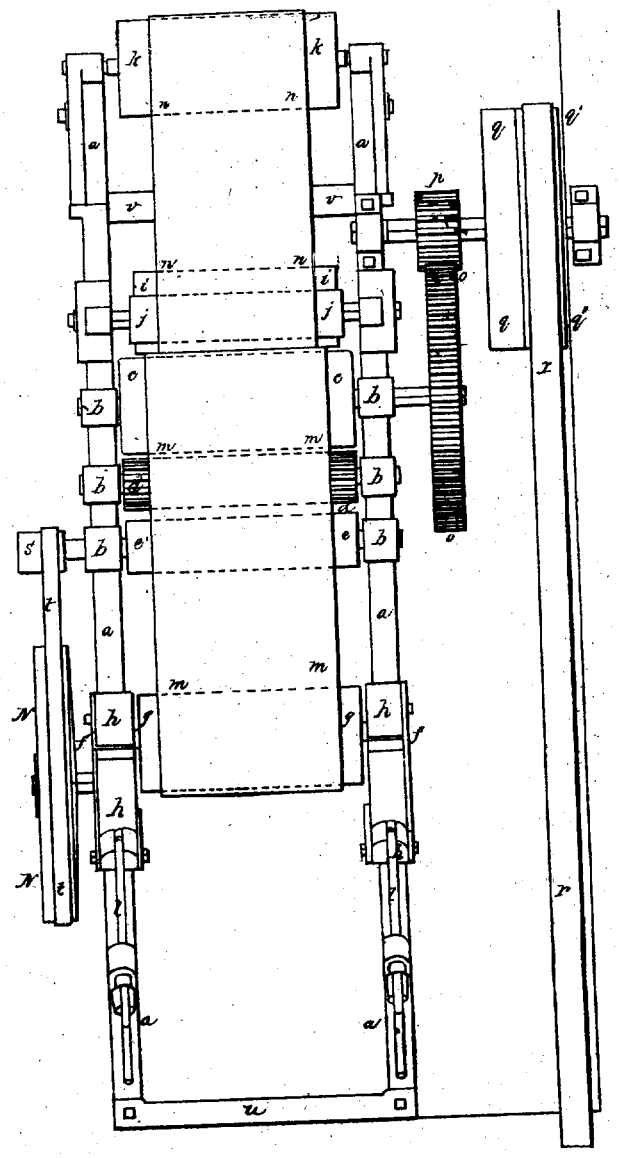

Fig. 2. an elevation in front shewing the head of the machine.

Figure 3:
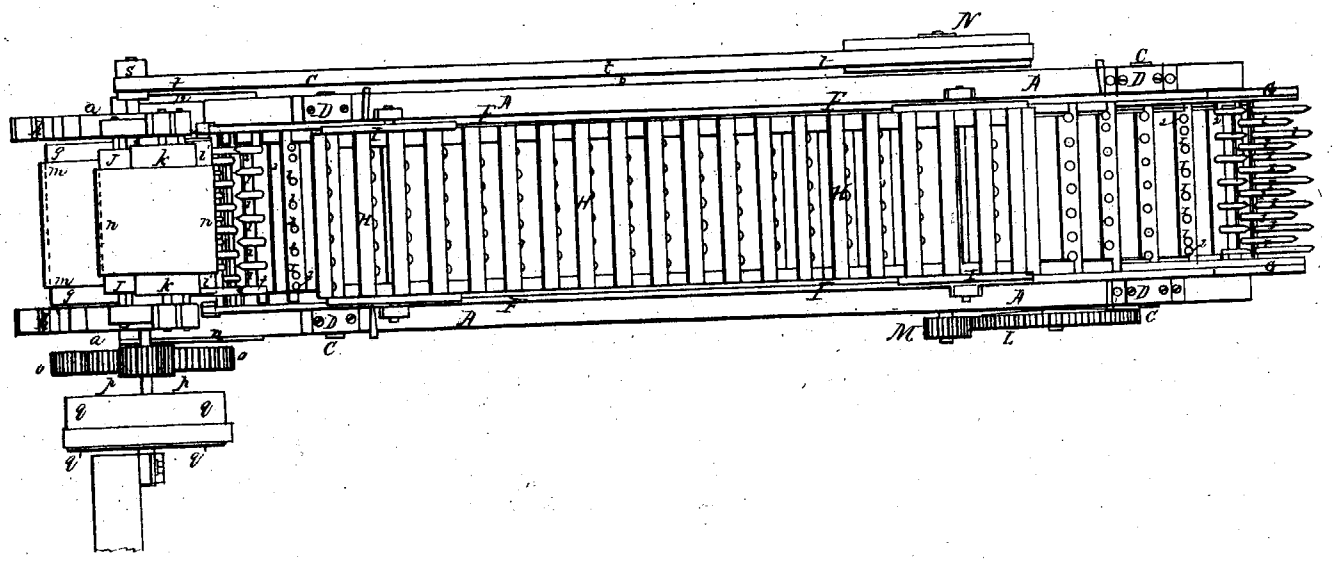

Fig. 3. is a plan. The same letters refer to the same part in all the figures. A,A, &c. is a wooden frame, B,B two cylinders, the axles of which C,C, turn in boxes D,D, of the frame A A – E,E,E, is a hatchel belt. To form this belt several rows of points (111 fig. 3) are fixed into plates of iron, and on the outside or end of each row of points there is fixed, in the same plate, two pins 2, 2, figs 1 and 3. The pins are longer than the points and terminate in an enlargement forming a head. Each row of points is furnished with a clearer, formed of a plate of iron, somewhat longer than the plate which holds the points, and pins, perforated with a number of holes corresponding to the points and pins, and capable of being moved up and down on the same from the plate to the heads of the pins. A sufficient number of rows of points thus formed, are placed upon a strap of leather. Another strap of leather perforated with holes for the points to pass through is then

7995X passed under the clearers and pressed down upon the plates, the points passing through the holes.. The two straps are then rivetted together, having the plates between them. The straps thus united are then passed round the cylinders B.B. and having their ends properly secured together, constitute with the plates, pins &c. the hatchel belt, as seen at E.E.E. The rails F.F. support the clearers, the projecting ends of which rest upon the rails, while a ledge on the inside of each rail supports the ends of the plates to which the points are fixed. It will be seen that the ends of the rails, nearest to the head of the machine, hereafter to be described, are formed into a curve having a longer radius, than that of the cylinder B, so that as the top of the hatchel belt, advances towards the head of the machine, the clearers in passing over this curved part of the rails, are raised from the leather belt which is in contact with the cylinder, to the top of the pins.

G,G, are two iron plates, called forcing plates, which carry the clearers from the top of the pins towards the leather belt as they pass successively by them, when carried from the bottom to the top of the left hand cylinder. H.H, is the bobbin belt, formed of a number of small wooden cylinders, fixed at their ends to two belts of leather. The bobbin belt passes over the pulleys I,I,I, the axles and bearings of which are distinctly seen in the drawings. The hatchel belt, bobbin belt, rails forcing plates, and connections, resemble in their form and construction an apparatus already patented, and in use, and are hereby declared to form no part of the invention for which a patent is now claimed. J, is a gear wheel on the shaft of the cylinder B. K, is a pinion driving the same. L, is a gear wheel on the shaft of K. M, is a pinion driving the wheel L. N, is a pulley on the shaft of M. The several shafts of these wheels and pinions run in boxes on the frame A.A. as seen in the drawings.

The head of the machine is seen at the several figures in its proper position, a,a,a,a, are two cast iron posts, to which are fixed the boxes b,b,b, holding the three rollers or pulleys, c, d, and e, f, f, are boxes, holding the pulley g. The boxes f, f, are fixed in the sliding frames k, k, which are capable of sliding up and down
on the posts a, a, a. There are likewise, three pulleys i, j, k, running
in proper boxes fixed upon the posts a, a, a, as seen in the draw-
ings. l, l, are screws passing through studs on the sliding frames
k, k, and likewise through studs on the posts a, a, a. Each screw
l, l, is furnished with a thumb nut as seen in the drawings.
m, m, m, is an endless band or belt, called a drawing belt, which
passes over and encompasses c, e, and g. and none others. n, n, n,
is another endless band or belt, called a drawing belt which passes
over and encompasses the pulleys d, i, j, and k, and none others.
The positions of the several pulleys, as shown in the drawings,
together with the lines marked out for the belts, will show clearly the
line of each belt and the course which they must take when the pulleys
are made to revolve. The belt m, m, is tightened by turning up the
thumb nuts on the screws l, l, which draws the pulley g, downwards. The belt
n, n, is tightened by raising the boxes which bear the shaft of the
pulley k, upward and securing them to the posts by the screws, as
represented in the drawings. o, is a cog wheel, upon the shaft of the
pulley e, p, is a pinion running in the wheel o. The pinion p, is fixed
upon a proper shaft one end of which runs in a box fixed to the post a,
and the other end runs in a box fixed upon any proper support set
up for the purpose. q, is a tight pulley fixed upon the shaft of the
pinion p, q, is a loose pulley capable of turning upon the same shaft.
r, is a belt running from a drum below the floor, or wherever else it
may be convenient to place it, for driving the machine. s, is a pulley upon
the shaft of the pulley e. t, t, t, is a belt passing over the pulley s, and
the pulley N. heretofore described. The posts a, a, a, stand upon the
floor and are kept at a proper distance from each other by the bars
u and v, and are connected with the frame A A, by the connecting
bars or plates w and x. z represents a plate of sheet iron fixed to
the stud y, which stud is fixed to the rail F F. A like plate and
stud is fixed to the rail upon the opposite side to that seen at Fig. 1.

The object of these plates is to direct the hemp, as will be hereafter described, to the drawing belts m and n.

Let us now suppose, the belt r, running in the direction of the arrow, to be passed upon the tight pulley q. This will give motion to the several wheels, pulleys and belts, in such directions and with such velocities as must be due to their relative sizes and connexions, which have been before described, or may be seen and measured by the drawings. Now suppose a quantity of hemp forming a column, or large roving, to be placed in a trough, or upon a board, so that its end shall be conducted to the hatchel belt. This will be pressed into and pierced by the points of that belt by the action of the bobbin belt and pass along with that belt until its end arrives at the plates 3 3. These plates direct it to the place where the belt m, meets the belt n, on the upper side of the pulley c, and beneath the pulley d. Now the tension of the belt m, being very great, this nips or presses the fibres of hemp very closely upon the belt n, passing round the pulley d, and they are carried in the space between the two belts, and on the outside of both, in the direction which those belts pass, until they are delivered where the belts separate from each other, above the pulley c, and under the pulley j. It will be understood that the hemp is nipped and carried along wholly by the tension of the belts and that the distance from the periphery of one pulley to the periphery of another pulley, is always greater than the thickness of both belts together with the thickness of the fibres of hemp forming the roving. The drawing belts move much faster than the hatchel belt, as will be seen by the sizes and connections of the parts concerned in producing the motions. Therefore the fibres of hemp must be drawn through the points of the hatchel belt and the column of hemp which lay in the hatchel belt must be reduced in size to a degree corresponding with the greater velocity of the drawing belts than that of the hatchel belt. As the hemp may be continually supplied to the hatchel belt in the manner before described, the fibres of hemp will continue to be formed into a roving, falling down as it is delivered from the drawing belts, into a can; or when drawn sufficiently fine, it may be twisted, as it is delivered from the belts by any proper apparatus into a yarn.

I hereby declare, that however I may have described other things in this Specification, I confine my claim for a patent, to the part which I call the head of the machine, or, to the combination of which the said head exhibits the character; and further, to the uniting the head thus described, with the other parts of the machine. In testimony that the above is a true specification of my said improvement, I have hereto set my hand this first day of November, in the year of our Lord Eighteen hundred and thirty three.

Witnesses — Daniel Treadwell

Theodore A. Dann

Horatio M. Willis

Exd. 1196.

Patented February 3rd. 1834.

(2130 words)

Drawing